(12) United States Patent
Avore et al.

(10) Patent No.: US 10,387,548 B2
(45) Date of Patent: Aug. 20, 2019

(54) SYSTEMS AND METHODS FOR TRANSCRIPT PROCESSING

(71) Applicant: Nasdaq, Inc., New York, NY (US)

(72) Inventors: Christopher Avore, Shrewbury, NJ (US); Joseph McNeil, Warren, NH (US); Christian Eckels, New York, NY (US)

(73) Assignee: NASDAQ, Inc., New York, NY (US)

(*) Notice: Subject to any disclaimer, the term of this patent is extended or adjusted under 35 U.S.C. 154(b) by 36 days.

(21) Appl. No.: 15/096,492

(22) Filed: Apr. 12, 2016

(65) Prior Publication Data

US 2016/0306788 A1 Oct. 20, 2016

Related U.S. Application Data

(60) Provisional application No. 62/148,669, filed on Apr. 16, 2015.

(51) Int. Cl.
G06F 17/22 (2006.01)
G10L 15/26 (2006.01)
G06F 16/683 (2019.01)
G06F 16/638 (2019.01)
G10L 17/00 (2013.01)

(52) U.S. Cl.
CPC ........ *G06F 17/2247* (2013.01); *G06F 16/638* (2019.01); *G06F 16/685* (2019.01); *G10L 15/26* (2013.01); *G10L 17/00* (2013.01)

(58) Field of Classification Search
CPC ......... G06F 17/27; G10L 15/00; G10L 25/57; G10L 25/48

USPC .................................................. 704/231, 275
See application file for complete search history.

(56) References Cited

U.S. PATENT DOCUMENTS

| | | | | |
|---|---|---|---|---|
| 6,332,122 B1* | 12/2001 | Ortega | ..................... | G10L 15/26 704/231 |
| 6,754,631 B1* | 6/2004 | Din | .......................... | G10L 17/00 704/270 |
| 7,711,550 B1* | 5/2010 | Feinberg | ................ | G06F 17/278 704/1 |
| 8,611,507 B2* | 12/2013 | Mikan | ................ | H04M 3/42221 379/88.11 |
| 8,935,713 B1* | 1/2015 | Gabel | .................... | H04H 60/65 705/14.53 |
| 9,443,518 B1* | 9/2016 | Gauci | ..................... | G10L 15/26 |
| 2004/0093220 A1* | 5/2004 | Kirby | ...................... | G06F 17/27 704/278 |

(Continued)

OTHER PUBLICATIONS

Francis Kubala, Sean Colbath, Daben Liu, and John Makhoul. 1999. Rough'n'Ready: a meeting recorder and browser. ACM Comput. Surv. 31, 2es, Article 7 (Jun. 1999).*

(Continued)

*Primary Examiner* — Paras D Shah
(74) *Attorney, Agent, or Firm* — Nixon & Vanderhye, P.C.

(57) ABSTRACT

The technology relates to systems and methods for transcribing audio of a meeting. Upon transcribing the audio, the systems and methods can parse different portions of the prescribed audio so that they may attribute the different portions to a particular speaker. These transcribed portions that are attributed to a particular speaker are made available for viewing and interacting using a graphical user interface.

18 Claims, 13 Drawing Sheets

(56) References Cited

U.S. PATENT DOCUMENTS

| | | | |
|---|---|---|---|
| 2004/0186712 A1* | 9/2004 | Coles | G10L 15/26 704/235 |
| 2005/0209848 A1* | 9/2005 | Ishii | H04L 12/1831 704/231 |
| 2006/0089857 A1* | 4/2006 | Zimmerman | G06F 19/322 705/2 |
| 2010/0158213 A1* | 6/2010 | Mikan | H04M 3/42221 379/88.14 |
| 2012/0053936 A1* | 3/2012 | Marvit | G10L 15/26 704/235 |
| 2013/0058471 A1* | 3/2013 | Garcia | H04M 3/42221 379/202.01 |
| 2013/0144603 A1* | 6/2013 | Lord | H04L 12/1831 704/9 |
| 2016/0189103 A1* | 6/2016 | Liu | G06Q 10/10 704/9 |
| 2016/0300373 A1* | 10/2016 | VanBlon | G06F 17/211 |

OTHER PUBLICATIONS

Tur, Gokhan, et al. "The CALO meeting assistant system." IEEE Transactions on Audio, Speech, and Language Processing 18.6 (2010): 1601-1611.*

Ranchal, Rohit, et al. "Using speech recognition for real-time captioning and lecture transcription in the classroom." IEEE Transactions on Learning Technologies 6.4 (2013): 299-311.*

* cited by examiner

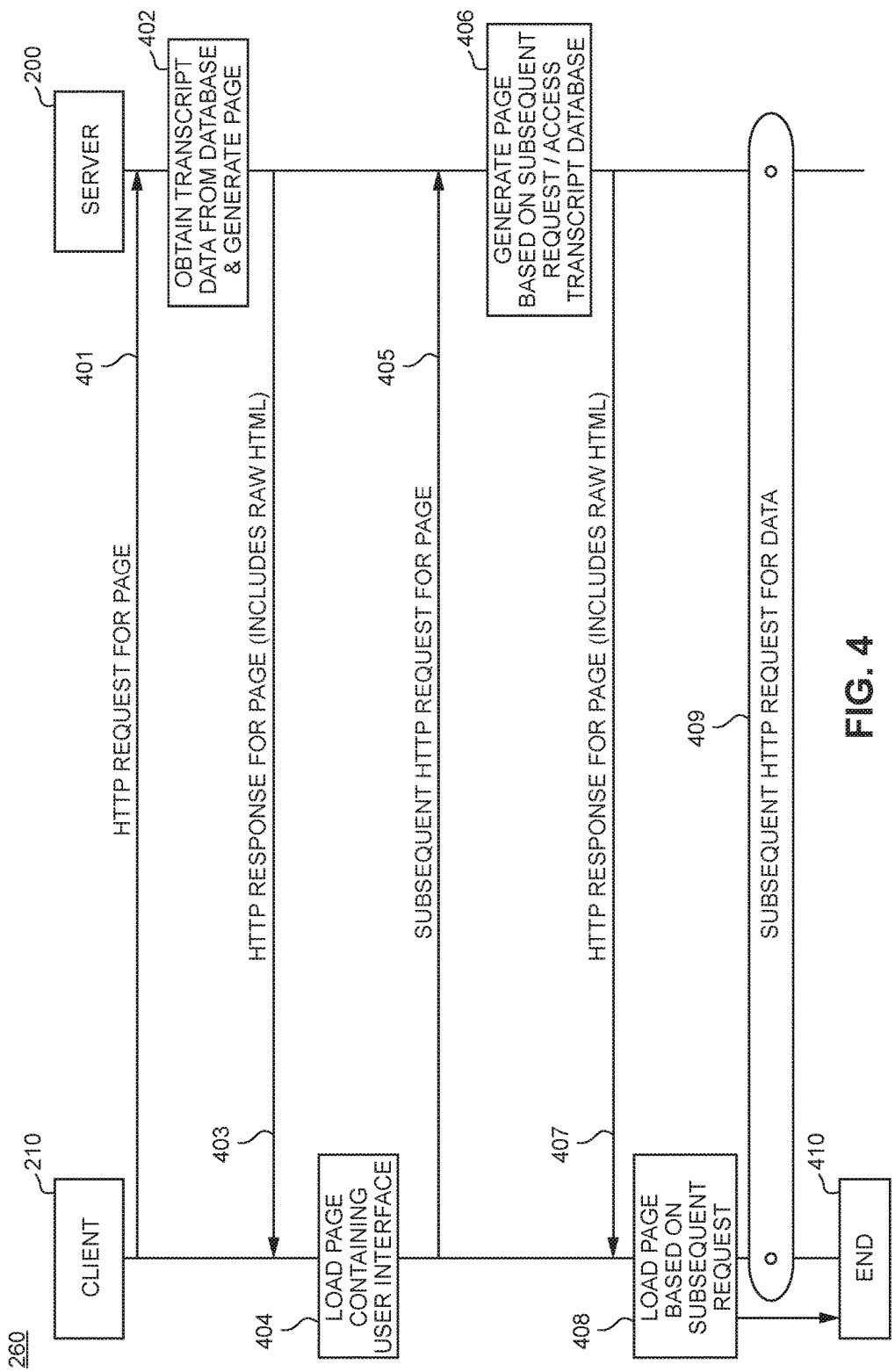

```xml
<?xml version="1.0" encoding="UTF-8"?>
  <Event eventTypeName="Earning Conference Call/Presentation" eventTypeId="1" lastUpdate="Tuesday, March 11, 2014 at 5:92:34pm GMT" id="2729679">
    <EventStory id="2720679_F" version="Final" storyType="transcript" action="publish" expirationDate="Thursday, February 25, 2010 at 4:00:00pm GMT">
      <Headline>
        <![CDATA[Edited Transcript of COMPANY earnings conference call or presentation 25-Feb-10 4:00pm GMT]]>
      </Headline>
      <Body>
        <![CDATA[COMPANY Q4 and 2009 Year End Earnings Call NEW YORK Mar 11, 2014 (Event) -- Edited Transcript
        of COMPANY earnings conference call or presentation Thursday, February 25, 2010 at 4:00:00pm GMT TEXT version of Transcript
        ================================================================================
        Corporate Participants
        ================================================================================
        * JANE SMITH COMPANY - Senior Managing Director, Public Markets * JOHN SMITH COMPANY - CFO * JIM SMITH COMPANY - President and COO * JUDE SMITH COMPANY - Chairman and CEO
        ================================================================================
        Conference Call Participants
        ================================================================================
        * Participant A FIRM A - Analyst * Participant B FIRM B - Analyst * . . . * Participant n FIRM n - Analyst
        ================================================================================
        Presentation
        ================================================================================
        Operator [1] ---- Welcome to the COMPANY fourth-quarter and 2009 year-end earnings conference call. Our speakers today are JUDE SMITH, Chairman, CEO and Co-Founder, JIM SMITH, President and Chief Operating Officer, JOHN SMITH, Chief Financial Officer, and JANE SMITH, Senior Managing Director, Public Markets. And now I would like to turn the call over to JANE SMITH, Senior Managing Director, Public Markets. Please proceed. ---- JANE SMITH, COMPANY - Senior Managing Director, Public Markets [2] ---- Great. Thank you, Tawanda. and welcome, everyone. We will review our fourth-quarter and full-year 2009 results today. We had a busy quarter with great financial gains . . . And with that, I will turn it over to JOHN SMITH. ---- JOHN SMITH, COMPANY - CFO [3] ---- Thank you, JANE. Good morning, everyone. Just following up on what JANE said . . . I will now turn it over to JUDE SMITH. ---- JUDE SMITH, COMPANY - Chairman and CEO [4] ---- Thanks! In 2009, we witnessed the stabilization of the global financial system that was near the brink of collapse. We saw a massive rally across most asset classes . . . take advantage of new strategic opportunities. Thank you for joining the call. We all look forward to answering any questions you may have. ---- JANE SMITH, COMPANY - Senior Managing Director, Public Markets [5] ----
        ================================================================================
        Questions and Answers
        ================================================================================
        Operator [1] ---- MIKE, if you can open up the line for Q&A.
        ---- Participant A, FIRM A - Analyst [2] ---- Thank you. (Operator Instructions) The first question comes from the line of Participant A with FIRM A. Please proceed. ---- Participant A, FIRM A - Analyst [3] ---- Good morning, . . . in a tougher market, how many companies do you think you could bring to market this year? ---- JIM SMITH, COMPANY - President and COO [3] ---- Participant A, FIRM A - Analyst [4] ---- Participant A, this is JIM. Why don't I tackle that. I think one of the things . . . we could easily see something like 10 or 12 monetizations this year. ---- Participant A, FIRM A - Analyst [5] ---- Okay, great. That is helpful . . . And then also, I guess, JUDE, you were going through the deals or the leverage . . . how does that compare to maybe your average over time, maybe excluding '06 and '07, when deal sizes were a little bit bigger? ---- JUDE SMITH, COMPANY - Chairman and CEO [5] ---- I guess our average deal size . . . is around $400 million equity checks. So we can -- it's plenty of capital to do average-sized deals. ---- Participant A, FIRM A - Analyst [7] ---- Yes, that's what I was going to -- okay. Great. . . .
        ---- Operator [77] ---- . . . Ladies and gentlemen, that is all the time we have for questions today. And now I would like to hand the call back to JANE SMITH. ---- JANE SMITH, COMPANY - Senior Managing Director, Public Markets [78] ---- Thank you, everyone, for joining us. And if there are any follow-ups, just feel free to give me a call directly. Thanks. ---- Operator [79] ---- Thank you for joining today's today's conference. That concludes the presentation. You may new disconnect. And have a great day. ]]>
      </Body>
    </EventStory>
    <eventTitle>
      <![CDATA[The Smith Group Q4 and 2009 Year End Earnings Call    ]]>
    </eventTitle>
    <city>NEW YORK</city>
    <companyName>Smith Group LP</companyName>
    <companyTicker>SX</companyTicker>
    <startDate>25-Feb-10 4:00pm GMT</startDate>
    <companyId>210612</companyId>
    <CUSIP>0925JU108</CUSIP>
    <SEDOL>B1YWNW1</SEDOL>
    <ISIN>US89253U1068</ISIN>
  </Event>
```

FIG. 5

601 — Ms. Rose Smith
✉ rosiesmith@company.com
☎ +44-20-7774-1000
📍 London, England Company International
Security Analyst Job Focus: Sellside
Job Function: Security Analyst
Contact Type: Institutional Recent Research
(90 pages) 01/13/15 05:11 AM
Global Retail: A new framework to identify leading retailers in an omnichannel world
(91 pages) 12/24/14 09:21 AM Recent Earnings Q&A — 602

Q3 2014 Company Earnings Conference call
11/11/14 08:00 AM
Yes, Good morning, just two questions from me. Firstly, just on recent movements in the oil price, clearly you've talked about your net/fx on 2014 for direct materials. But next year it should have a bit... — 603

Full Year 2014 Company Earnings Call
11/04/14 09:00 AM
It's Rose Smith from Company A. Just one question, again on Primark in the US. You talk in the release about a strategy to generate interest and awareness of the brand. I'm just interested in how... — 604

Coverage
Macro Sector: Basic Materials, Consumer Cyclicals, Consumer Non-cyclicals, Show More
Mid Sector: Paper & Forest Products
Miscellaneous: Emerging Markets
Countries: United Kingdom, France, Sweden, Show More Background — 605
EMPLOYMENT HISTORY
Ms. Rose Smith is a security analyst at Company A International. Prior to joining the firm she served as a analyst at Company B.

Estimates  [Local Currency ▼]  [Peers] [All]

| Companies Covered | | EPS | REVENUE | PRICE TARGET | RECOMMENDATION |
|---|---|---|---|---|---|
| Company A | Q1 May-2016 | -- | -- | $69.00 | SELL |
| Company B | S2 Sep-2015 | -- | -- | $3,150.00 | BUY |
| Company C | Q2 Jun-2015 | 0.61 | $1,667 | $69.00 | SELL |
| Company D | Q2 June-2015 | $1.21 | 4,411 | $96.00 | SELL |
| Company E | S1 June-2015 | 3.90 | $13,572 | $191.00 | BUY |
| Company F | Q1 Mar-2015 | -- | -- | $26.50 | HOLD |

FIG. 6

| Rose Smith - Earnings Q&A | 13 | | | |
|---|---|---|---|---|
| ☐ My Company | | | | |
| ☐ ⊙ Ryan Test | | | | |
| Date Range | | | | |
| (LAST YEAR) | | | | |

| Date ▾ | Ticker ▾ | Event | Comments | |
|---|---|---|---|---|
| 11/11/14 | L-XE | Q3 2014 Company L Earnings Conference Call | Yes. Good morning. Just two questions from me. Firstly, just on recent movements in the oil price, clearly you've talked about your outlook on 2014 for direct materials. But next year it should have a bit of a tailwind from more raw materials. But would you expect that to be passed back to customers within adhesives and consumers within HPC? And what is the outlook for pricing next year? And then secondly, you've also given some outlook on FX, particularly for your top line. Can you give us any clue as to no FX has impacted your margins this year and how that has trended as we've gone through sequential quarters? | ▦ ⌕ |
| | | | Okay. Thank you. And sorry, just following up on the first question. If I look over the past five to seven years, pricing has not ever been negative though in adhesives. Is there a reason to think that would be different next year? | |
| | | | Okay. All right. Thank you. | |
| 11/04/14 | M-G | Full Year 2014 M PLC Earnings Call | It's Rose Smith from Company A. Just one question, again on Primark in the US. You talk in the release about a strategy to generate interest and awareness of the brand. I'm just interested in how you propose doing that. And does that mean you're taking a different strategy from Europe, where you don't really spend a lot of money on advertising and such? | ▦ ⌕ |
| 11/29/14 | N-SE | Q3 2014 Company N Earnings Call | Two questions. Firstly, just back on P&G, I think in the release you talked about P&G's intention to enter healthcare channels. I just wanted to clarify that and if so, do we know which markets they're planning to do that? And then second question, a bigger picture on operating margins. Two, three years ago a Group operating margin of 14% was speculated and talked about. What is your latest position on this, given margins are still only around the 11%? | ▦ ⌕ |
| | | | Okay, yes, that's fine. Thank you. | |

Company AA | OVERVIEW — 1000 | ESTIMATES | RESEARCH | EARNINGS Q&A | OWNERSHIP | CONTACTS

Company A International — 1000
- www.companya.com
- London, England
- [PI]

Firm History
Founded: 1977. Company A

Recent Research
Americas: Capital Markets: 1Q15 mid-way stop: Little top-line excitement outside of M&A and idiosyncratic stories
Mr. Andrew Brown, CFA, CFA
(15 pages) 04/24/15 06:11 AM Americas: Capital Markets: Looking under the hood as macro drivers create diverging 1Q15 trends
Mr. Andrew Brown, CFA, CFA
(23 pages) 03/31/15 06:01 AM

Recent Earnings Q&A — 1002

Full Year 2014 Company G Earnings Call (IFRS) — 1003
Mike Smith (Security Analyst)
03/12/15 02:00 PM Hi, Evgeny. Thanks for the presentation. I have two questions. The first one is on your dividend policy. As far as I'm concerned, your dividend policy expires this year and your should present an updated...

Q3 2014 Company F Earnings Call (IFRS) — 1004
Troy Green (Security Analyst)
11/19/14 02:00 PM Hi guys, most of my questions have been answered. Just a couple of things I wanted to check with you. One is on the net interest income is it fair to assume that the fourth quarter will be even stronger, given...

Estimates

Local Currency ▾ | Peers | Mid Sector

| Peers Covered | | EPS | REVENUE | PRICE TARGET | RECOMMENDATION |
|---|---|---|---|---|---|
| Company AA AAA-USQ | Q2 Jun-2015 | 0.80 | — | 41.00 | SELL |
| Company CC Inc CCC-USQ | Q2 Jun-2015 | -0.56 | — | 510.00 | BUY |
| Company DD Inc DDD-USQ | Q2 Jun-2015 | 0.65 | — | — | — |
| Company EE Inc EEE-G | S1 Jun-2015 | 18.85 | 8,240 | 611.00 | BUY |

Key Contacts — 1001

Contact 1
Security Analyst
44-20-7425-8000
contact1@company.com
Show Coverage

Contact 2
Security Analyst
44-20-7677-8130
contact2@company.com
Show Coverage

Contact 3
Security Analyst
44-20-7677-8130
contact3@company.com
Show Coverage

Contact 4
Security Analyst
contact4@company.com
Show Coverage

Contact 5
Security Analyst
44-20-7677-8130
contact5@company.com
Show Coverage

FIG. 11

SYSTEMS AND METHODS FOR TRANSCRIPT PROCESSING

CROSS REFERENCE TO RELATED APPLICATION(S)

This application claims benefit of priority to U.S. Patent Application No. 62/148,669 filed Apr. 16, 2015, the entire contents of which are incorporated herein by reference.

TECHNICAL OVERVIEW

Technology is available for converting spoken words into written text. So called transcription (or "speech-to-text") technology can be found in a variety of platforms that range anywhere from dictation software to voice "texting" on modern smartphones. The technology can use different speech recognition techniques that identify words and phrases spoken by an individual in order to transcribe the audio into a textual representation. The algorithms used by this technology are typically sophisticated enough to prepare logical sentences based on what the application "heard" the user speak.

Conventional transcription technology is useful for transcribing the spoken word of an individual. However, conventional transcription technology is still developing for transcribing a conversation between multiple people. For example, a group of individuals may hold a conference (e.g., in-person, via telephone) where participants can join in and listen or even ask questions and engage the presenter in conversation. Presently, human services are available to transcribe the spoken dialogue between the different members of the group. The transcribed conversation can then be provided as part of a written transcript with the text and speakers identified in the transcript.

However, such an approach is input intensive and requires great interaction and reliance on the user providing the input. Thus, conventional technology lacks a method for conveniently transcribing audio from group meetings and/or conferences and efficiently storing such data in a processing system. Moreover, conventional technology lacks an ability to easily identify dialogue from a speaker in the conversation and present the same to a user (i.e., via a user interface).

INTRODUCTION

The technology described herein addresses the problems in the conventional technology, in part, by providing a system capable of matching portions of transcribed dialogue to a respective speaker. Once matched, the system can then generate a user interface for display that shows the dialogue associated with a particular speaker in a manner that allows for easy selection and navigation (e.g., to provide further context in which the dialogue was associated with a given conversation). The technology allows for more efficient storage and processing of the transcript data and improves the system's ability to display information and interact with a user.

Accordingly, it will be appreciated that new and improved techniques, systems, and processes are continually sought after.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The technology described in this document relates to systems and methods for transcribing audio of a group of individuals (e.g., discussing topics at a meeting). After transcription of the audio, different portions of the transcribed audio are parsed so that they may be attributed to a particular speaker. These transcribed portions that are attributed to a particular speaker are made available for viewing and interacting using a graphical user interface.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 4 shows a non-limiting communication process between a client and server in an exemplary system according to the present technology;

FIG. 5 shows a non-limiting example of an XML file that contains various transcript data;

FIGS. 6-11 show non-limiting examples of graphical user interfaces produced by the present technology.

DETAILED DESCRIPTION

Figure 1:
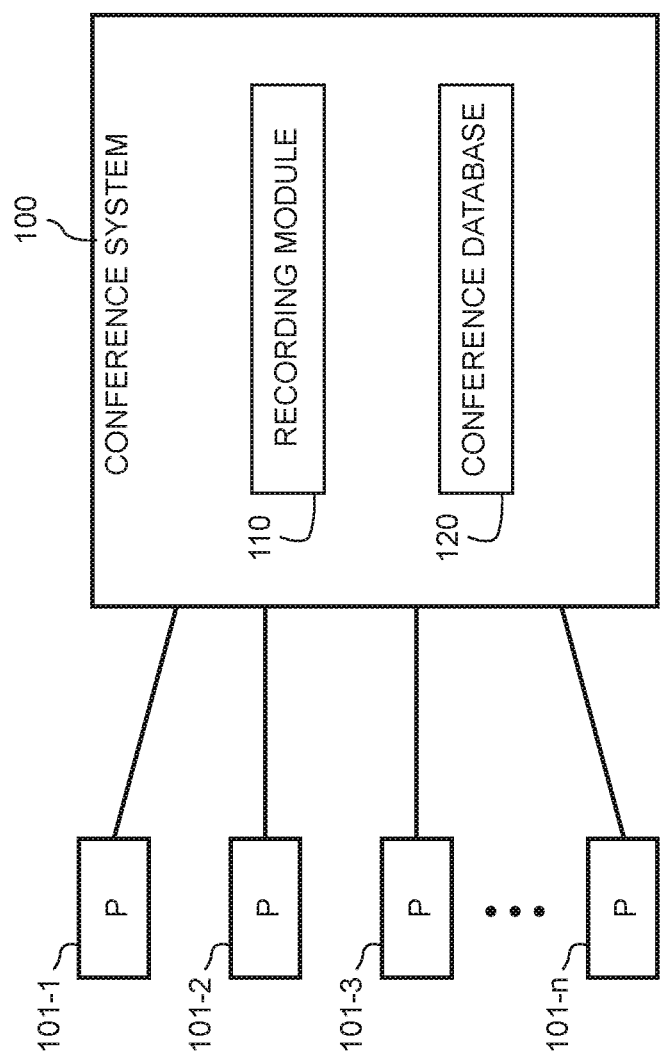
FIG. 1 depicts a non-limiting example block diagram of a system.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other topics, a transcription processing system that may be used for identifying and associating different portions of a transcribed conversation to the respective speaker. When a conversation occurs between two or more people, audio from the conversation is transcribed into a text document and the text document can be stored in a database. In one example, the text document could be in the form of an Extensible Markup Language (XML) document where different XML tags are used to identify aspects of the conversation. Certain delimiters can also be incorporated into the document to separate different portions of the spoken text for different speakers. For example, text representing spoken dialogue could be followed by a comma, semicolon, or any other type of delimiter to indicate that the speaker has finished speaking for that portion of dialogue. Identification of the speaker could then immediately follow the delimiter in sequence.

More specifically, the text document can be parsed so that different portions of the spoken dialogue are associated with a respective speaker. For example, a software algorithm can parse the text document and determine which portions of the document belong to spoken dialogue (e.g., based on an XML tag identifying the dialogue). When parsing the text representation of the spoken dialogue, the algorithm can identify the portion spoken by the speaker as well as various information identifying the speaker.

Once the portions of the spoken dialogue are associated with a given speaker, the associated text representation of the dialogue can be stored in a database. A user interface can then be generated that allows for easy identification of the user to the spoken dialogue. For example, a client can request generation of a web page from a web server that has access to the transcript data in the database. The server will then transmit the code for generating the page to the client device, and the client device can then generate the page, which shows portions of text from the transcript of the spoken dialogue. The page can also include information identifying the speaker and/or information related to the event in which the conversation took place.

Figure 2:
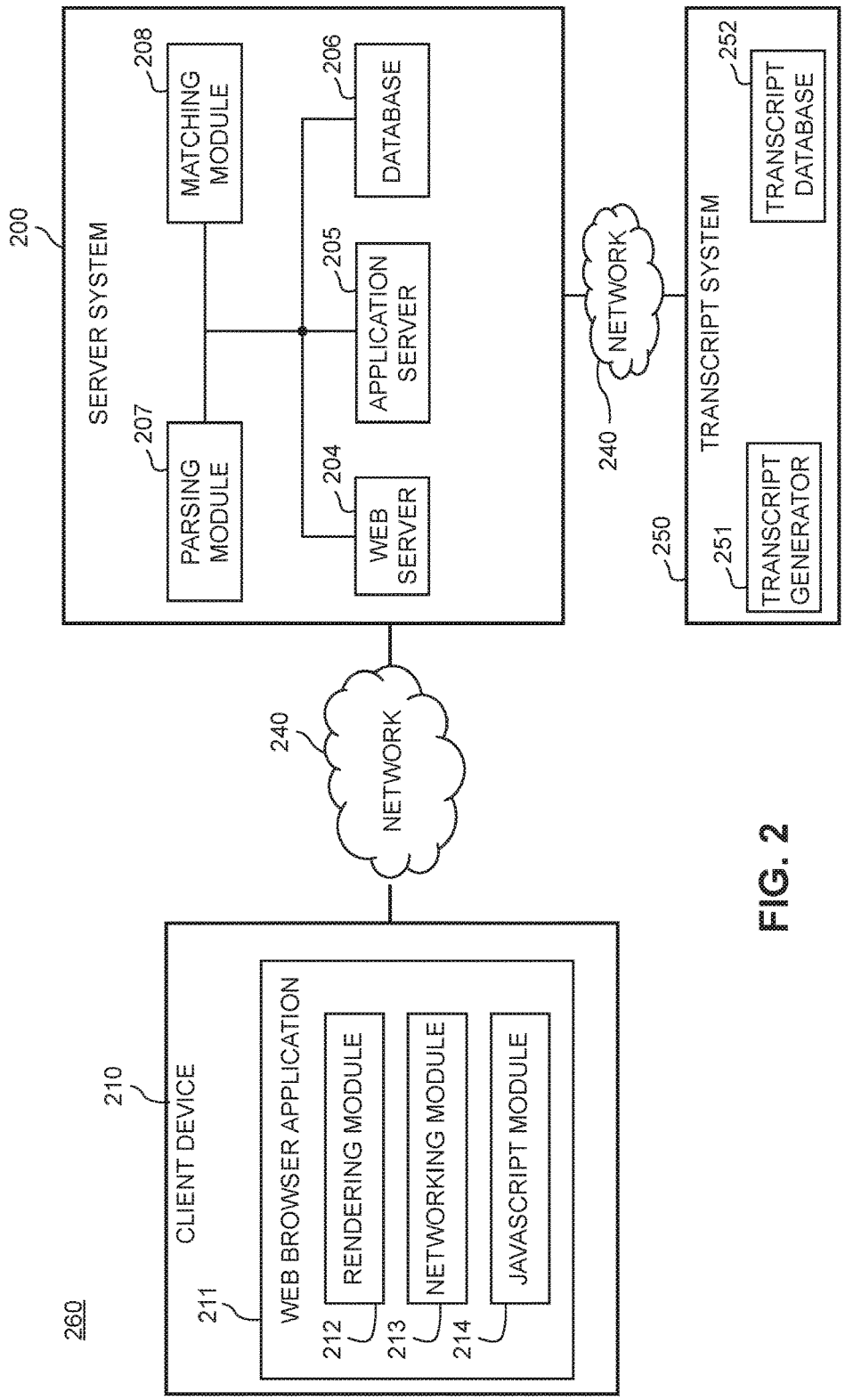
FIG. 2 depicts a non-limiting example block diagram of a transcript processing system.
Figure 3:
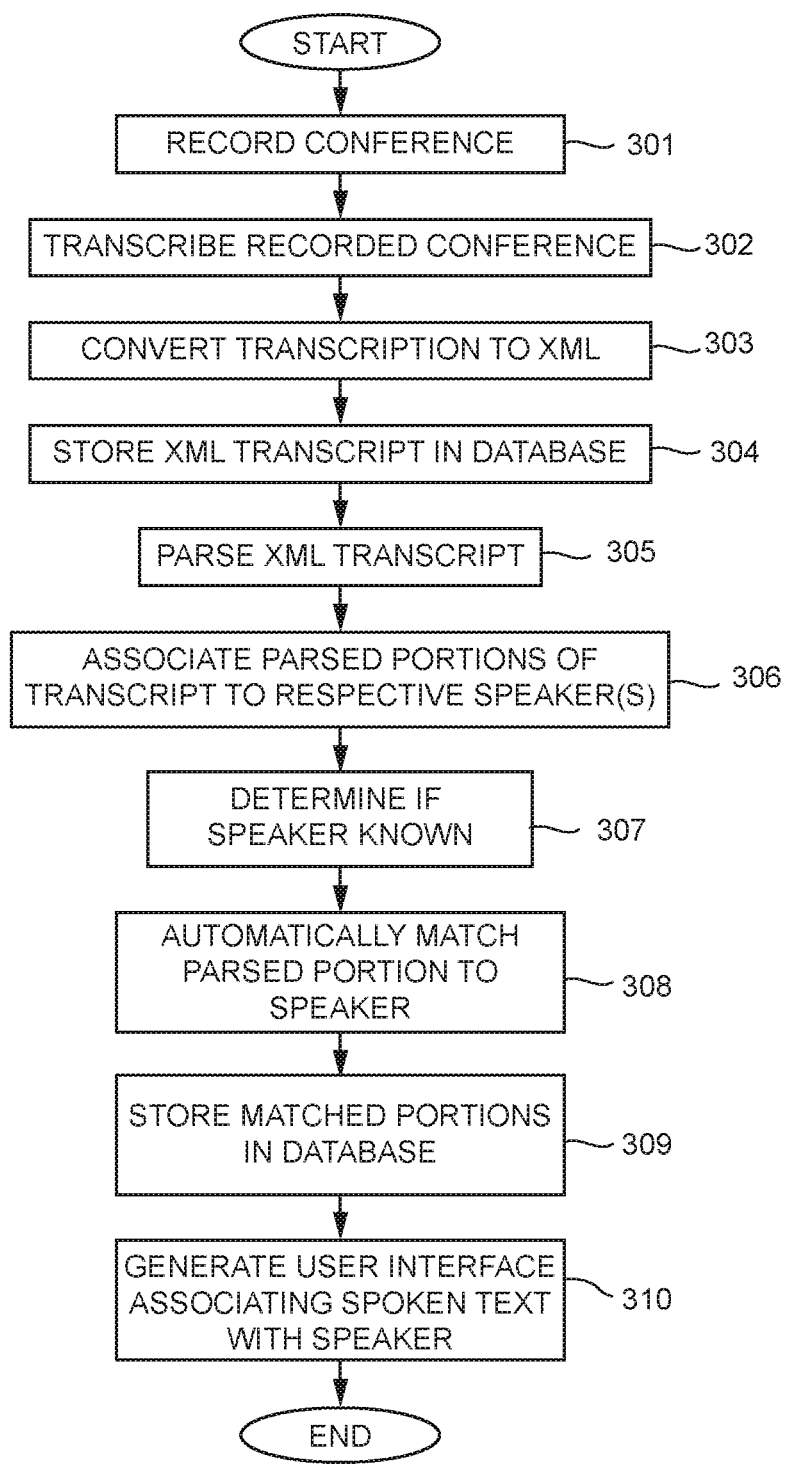
FIG. 3 shows a non-limiting example flowchart for processing transcript data.
Figure 12:
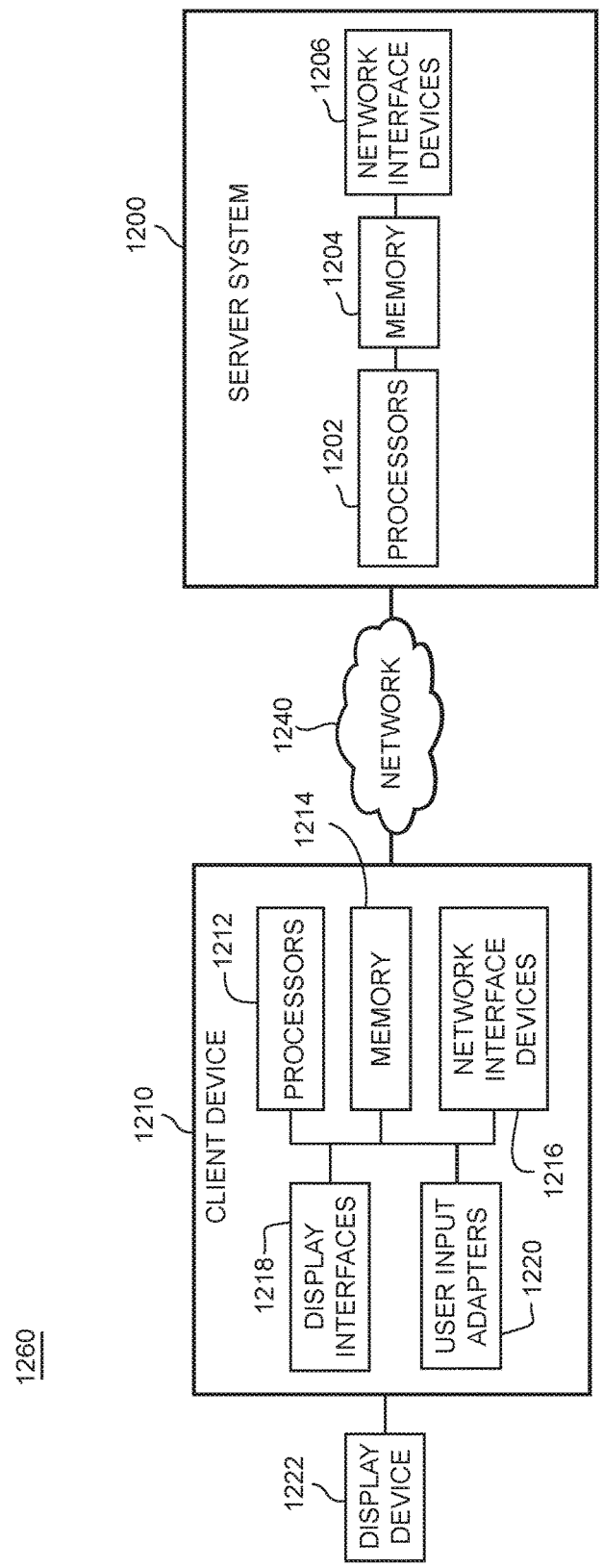
FIG. 12 shows a non-limiting example block diagram of hardware components comprising the system shown in FIG. 2.

FIG. 1 shows an example system in which the framework for recording a conversation between multiple participants may be implemented. FIG. 2 shows an example system for processing transcript data based on the recorded conversation between multiple participants (which can be recorded using the system shown in FIG. 1), and for generating a user interface, wherein software architecture aspects of the system are highlighted. FIG. 3 depicts a method for processing the transcript data and generating the user interface using the architecture of FIG. 2. FIG. 4 shows a process wherein pages within an example application are loaded for generating a user interface in the transcript processing system. FIG. 5 shows an example portion of an XML file of a transcript used by the system shown in FIG. 2 to process the transcript and generate the user interface. FIGS. 6-11 show non-limiting example embodiments of user interfaces and corresponding requests made between a client and server related to different portions of an example application. FIG. 12 shows an example system in which the features described herein may be implemented, wherein hardware aspects of the system are highlighted.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Description of FIG. 1

FIG. 1 shows a non-limiting example conference system 100 for facilitating a conversation between multiple participants 101-1 to 101-*n* and recording audio data of a conversation between the multiple participants 101-1 to 101-*n*. Although the systems and methods described herein are applicable to any conversation between two or more people, the descriptions below are in the context of a conference between two or more people.

Conferences will have a number of participants 101-1 to 101-*n* that will participate. In one example, the participants 101-1 to 101-*n* will access the system 100 using an electronic interface that could include, but is not limited to, a telephone system and/or a computing device. The system 100 could conduct the conference using any of a telephone conference service and/or a computerized hosting service (e.g., a webcast). The conference system will also employ a variety of communication circuitry, as well as processing circuitry that includes input/output devices, data transceivers (for transmission of digital and/or analog signals), one or more processors (e.g., a CPU), one or more storage devices (e.g., a memory), and/or one or more audio/visual components (e.g., sound interface, display).

The conference system 100 can also employ recording module 110 for capturing the audio of the one or more participants 101-1 to 101-*n*. The recording module 110 can use any of a variety of methods for capturing the audio of a participant including capturing audio from the user's telephonic communication, capturing audio from a video conference that includes an audio feed, and/or capturing audio from a live event of the participant speaking at the conference. The audio captured by recording module 110 can be stored in database 120 of the conference system 100. The audio stored in the database 120 can be accessed by a human or computerized service for transcribing the audio into a text representation.

Description of FIG. 2

FIG. 2 shows a non-limiting example diagram of a system 260 wherein the framework for processing transcript data and generating a user interface can be implemented. As will be described below, one or more web applications that implement the framework for processing transcript data and generate the user interface can be deployed in the system 260, and the various components in the system 260 (such as the client device 210 and server system 200) can perform different functions related to the deployed web applications. The server system 200 can also interact with a transcript system 250 that generates transcript data and provides the same to the server system 200.

As will be discussed below, FIG. 2 shows primarily software modules (such as the web browser application 211) that run at the client device 210, server system 200, and the transcript system 250; it should be understood that the software modules shown in FIG. 2 are stored in and executed by hardware components (such as processors and memories); details regarding example hardware components that may be used to execute these software modules are provided below with reference to FIG. 12, as well as in other places in this document.

The transcript system 250 can obtain and store information related to transcript data of one or more spoken dialogues. In one example, the transcript system 250 can generate a transcript using transcript generator 251 from the audio captured by conference system 100, shown in FIG. 1.

The transcript generator 251 can use any variety of speech recognition software to generate a text transcript of a spoken conversation and the generated transcript can be stored in a transcript database 252 of the system 250. The database 252 may be or include one or more of: a relational database management system (RDBMS); an object-oriented database management system (OODBMS); an object-relational database management system (ORDBMS); a not-only structured query language (NoSQL) data store; an object cache; a distributed file system; a data cluster (based on technology such as Hadoop); and/or any other appropriate type of data storage system).

In one example, the transcript generator 251 can generate a transcribed audio conversation between two or more people into one or more structured documents (which may also be referred to as "structured data files," or the like), where the structured document(s) can be used by server system 200 for associating different portions of spoken dialogue with one or more individuals. An example of one such structured document is the XML document/file shown in FIG. 5 and described in detail below. It should be appreciated that the transcript system 250 can use software to automatically transcribe the audio provided by conference system 100, but can also provide an interface for manual modification of the transcript data. For example, one or more users could listen to the recorded audio and generate transcript data manually using various data input techniques.

The server system 200 is configured to communicate with the transcript system 250 (e.g., via a network 240). It should be appreciated that the network 240 could comprise a network of interconnected computing devices, such as the Internet. The network 240 could also comprise a local area network (LAN) or could comprise a peer-to-peer connection between the server system 200 and transcript system 250. The server system 200 could comprise any variety of server devices including, but not limited to, database servers, file servers, web servers, application servers, a server cluster (e.g., a cloud based computing environment), a standalone server, and/or any other portable or stationary computing device having server-based capabilities.

The server system 200 can include a web server 204 that performs functionality such as implementing the HTTP protocol and communicating with the web browser application 211 (described in further detail below) in the client device 210 via HTTP. The server system 200 can also include an application server 205 that can, for example, execute server-side (or "back end") instructions for applications that run on the server system 200. The server system 200 can also include a database 206 that manages the persistent storage of data that is used at the server system 200. The database 206 may be or include one or more of: a relational database management system (RDBMS); an object-oriented database management system (OODBMS); an object-relational database management system (ORDBMS); a not-only structured query language (NoSQL) data store; an object cache; a distributed file system; a data cluster (based on technology such as Hadoop); and/or any other appropriate type of data storage system).

The server system 200 obtains the transcript data from transcript system 250 as one or more structured documents, and then parses the data using parsing module 207. In some embodiments, the structured document(s) include an XML document, where different XML tags identify various portions of the document. In various other embodiments, the structured document(s) could be or include one or more Hypertext Markup Language (HTML) documents, one or more JSON documents, one or more Extensible HTML (XHTML) documents, and/or one or more structured documents of other types.

As shown in more detail in FIG. 5, in an embodiment where the structured is an XML document, the portion of the XML document having the transcript of the recorded conversation can be separated by one or more delimiters in the document. Thus, the parsing module 207 can use the delimiters to properly identify which portions of the document correspond to spoken dialogue and which portions correspond to identification of the individual speaking, for example. Once the XML document is parsed, server system 200 can use the matching module 208 to link the spoken dialogue and identity of the speaker to individuals stored in database 206. The matching module 208 provides capability for the server system 200 to generate a user interface showing the dialogue with the associated speaker.

In the example shown in FIG. 2, the client device 210 can also communicate with a server system 200 (e.g., via a network 240). It should be appreciated that the network 240 could comprise a network of interconnected computing devices, such as the Internet. The network 240 could also comprise a local area network (LAN) or could comprise a peer-to-peer connection between the client device 210 and the server system 200.

The client device 210 can include software components for performing processing related to web applications deployed in the system 260. As a non-limiting example, the client device 210 may have a web browser application 211 consisting of, at least, a rendering module 212, a networking module 213 and a JavaScript module 214. Of course, these modules are a non-limiting example, and the application 211 can comprise several more modules and/or different modules than those shown in FIG. 2. The client device 210 could comprise any variety of client devices including, but not limited to, a personal computer (e.g., a desktop computer, a laptop computer), a thin client, a hybrid client, a rich client, a game console, a tablet, a personal digital assistant (PDA), a smartphone, a digital music player having web interface capabilities, and/or any other portable or stationary computing device.

The rendering module 212 in the client device 210 can implement functionality for the graphical display and rendering of web pages. It can, for example, generate graphical data that corresponds to the HTML and/or DOM that defines a web page processed by the web browser application 211; this graphical data can, potentially after further modification/transformation by the operating system of the client device 210, be displayed on a display of the client device 210. Alternatively or additionally, whenever it is described in this document that the client device 210 renders/displays a web page, the rendering/displaying module 212 may perform functionality related to the rendering/display of the web page.

The networking module 213 can implement the HTTP protocol, and be used to handle various HTTP messages between the client device 210 and the web server 204 in the server system 200. Alternatively or additionally, whenever it is described in this document that the client device 210 communicates using HTTP, the networking module 213 may handle the HTTP aspects of such communications.

The JavaScript module 214 can be used to execute JavaScript scripts, manipulate JavaScript objects, modify the DOMs of web pages loaded at the web browser application 211, and perform other functionality related to JavaScript. The JavaScript module may be, for example, a JavaScript engine, a JavaScript virtual machine, a JavaScript runtime, or any other type of software module capable of executing JavaScript instructions. Alternatively or additionally, whenever it is described in this document that the client device 210 performs functionality related to JavaScript, such functionality may be handled by the JavaScript module 214.

It should be appreciated that while the diagram in FIG. 2 shows the components existing within a single system, the components could be incorporated in multiple systems and/or a distributed computing environment (e.g., a cloud computing environment). Thus, the processing system 200 is not limited to a single component and can be incorporated into multiple components.

Description of FIG. 3

FIG. 3 shows a non-limiting example method that may be performed by the server system 200 for processing transcript data and generating a user interface. As the method of FIG. 3 begins, the conference system 100 will record a conversation between two or more people (at action 301) and store the same in the conference database 120. As noted above, the conference system 100 can record audio from an electronically moderated conference and the audio can be stored in the database 120 in any variety of audio file format. For example, the audio can be stored as compressed audio and/or uncompressed audio, and in any format including, but not limited to, Advance Audio Coding format (AAC), MPEG Layer III Audio (MP3), audio-only MPEG-4 file (M4A), MPEG Layer IV Audio (MP4), Standard Windows Audio File Format (WAV), and/or Windows Media Audio Format (WMA). The audio stored in the database 120 can be provided to the transcript system 250 for generating a transcript of the audio data. In one example, the audio data can be transmitted to the transcript system 250 (i.e., via network 240) or can be obtained by the transcript system 250 in any variety of ways. It should be appreciated that in some embodiments, the conference system 100 can be incorporated into the transcript system 250 (or any components of the system 200).

At action 302, the stored audio data is transcribed into a text format using the transcript generator 251. In one example, the audio data can be converted to a raw text file automatically using different speech and audio recognition techniques. In another example, a user could listen to the audio recording and manually generate the data file using an input device. The transcript generator 251 can also convert the data into an XML file (at action 303) for processing by the server system 200. It should be appreciated that the transcript generator 251 could directly generate the XML file containing the transcript information from the audio data of the conference.

At action 304, the transcript system 250 can store the XML file containing the transcribed conversation in the transcript database 252. The server system 200 could obtain the transcript data stored in the database 252 of the transcript system 250 and store the data in the database 206 of the server system 200. In one example, the server system 200 could obtain the transcript data from system 250 via data transmission over network 240. Of course, such an example is non-limiting and the server system 200 could obtain the data using a variety of other methods (e.g., using a portable storage device). The transcript system 250 could also be incorporated as part of the server system 200 and thus database 252 and database 206 could communicate the information to each other within the server system 200 (or be incorporated into a single database).

At action 305, server system 200 can parse the XML data file using the parsing module 207. The parsing module 207 can identify different portions of the XML document based on the XML tags and location of the data within the document. For example, and as shown in more detail in FIG. 5, a tag containing the term "CDATA" in the body of the document could indicate to the parsing module 207 that text data following the tag contains a part (or all of) the transcribed conversation. Different portions of the text data could be separated by delimiters to indicate to the parsing module 207 as to which parts are spoken dialogue and which parts are portions identifying the speaker of the dialogue.

At action 306, the server system 200 can associate the different portions of the spoken dialogue in the XML document with various speakers. For example, the server system 200 could identify a portion of the XML document containing spoken dialogue and then, upon identifying the end of the spoken dialogue (e.g., by identifying a delimiter in the text), the server system 200 can determine the identity of the speaker. That is, the portion of the XML document immediately following the delimiter (that follows the text corresponding to the spoken dialogue) could contain a name of the individual speaking. Thus, the server system 200 would be able to associate the spoken text with an individual speaking.

At action 307, the server system 200 can determine if the identified speaker is associated with known speakers stored in the database 206 of the system 200. For example, the matching module 208 can attempt to determine if a speaker's name matches a record in database 206. If the name matches a record in database 206, the server system 200 automatically matches the parsed portion of dialogue to the speaker at action 308. In one example, the server system 200 could also require the creation of a record for a new speaker so that any future dialogue spoken by the individual is automatically matched.

At action 309, the matching module 208 can store the dialogue and the matched information in database 206. For example, the database could create an entry that identifies the speaker, the company for which the speaker works, the title the speaker holds at the company, the event in which the speaker was speaking (which could include the date and time of the event), as well as the spoken dialogue in text form. Using this information, the server system 200 can generate a user interface (at action 310) showing a part (or all) of the transcribed text along with information associating the text with different speakers and/or events. Such user interfaces may be generated and displayed, in some embodiments, as described in more detail below with reference to FIG. 4; and examples of such user interfaces are shown in the examples of FIGS. 6-11, discussed in more detail below.

Although the above description of FIG. 3 (especially with regards to action 303 through action 306) refer to XML documents, it should be understood that, in various embodiments, other types of structured documents (such as HTML, JSON, XHTML, and others) may be used; in such embodiments, the actions described above with reference to FIG. 3 may be performed, mutatis mutandis, with such other types of structured documents. Further, it should be understood that, although actions 301-310 are described above as separate actions with a given order, this is done for ease of description. It should be understood that, in various embodiments, the above-mentioned actions may be performed in various orders; alternatively or additionally, portions of the above-described actions 301-310 may be interleaved and/or performed concurrently with portions of the other actions 301-310.

Description of FIG. 4

FIG. 4 shows a non-limiting communication process between client device 210 and server system 200 in the system 260. FIG. 4 relates to an example web application that uses the described interface generated in the transcript processing system. In this example, and as will be described in detail below, the content for at least one page within the application is loaded at the client device 210. Although not shown in FIG. 4, the client device 210 may run the web browser application 211 shown in FIG. 2 and described above, and the server system 200 may run software modules such as the web server 204, application server 205, and database 206 shown in FIG. 2 and described above.

At action 401, the client device 210 sends an HTTP request message that includes a URL that points to a web page. At action 402, the server system 200 obtains, at least, the data from database 206 containing portions of transcribed dialogue and the information associated with the dialogue (e.g., identity of speaker, event in which dialogue was spoken). The server system 200 can also obtain other information for generating the web page. For example, the server system 200 will obtain information used in different portions of the page, such as the header and footer, as well as other elements that could populate the body of the page.

At action 403, the server system 200 begins preparing an HTTP response message to send back to the client device 210. In preparing the response, the server system 200 generates code for rendering a web page on the client device 210. The code can contain at least the data related to the transcript information as well as data identifying different portions of the speaker and/or event, as well as the additional content comprising the page requested by the client device 210. The server system 200 can then send an HTTP response message for the page; this response may include HTML code, JavaScript modules (including AngularJS modules) and Javascript code, and other code that corresponds to the page.

At action 404, the client device 210 can then fetch the code for rendering the web page from the server system 200 and then render the page using the web browser application 211. More specifically, the web browser application will load various elements using the rendering module 212 and different Javascript objects using the Javascript module 214.

In certain implementations, the client 210 may make additional requests to the server system 200 to obtain more information for generating a particular page (or for generating other aspects/portions of the page). For example, the user may select an object on the page where the client device 210 may need additional data so that it can modify the rendered page based on the user selection, or the user may make a selection requiring the client device 210 to load a new page. At action 405, the client device 210 can make such a subsequent request to server system 200 in which server system 200 will produce the code for rendering a new/modified page at client device 210, in action 406.

At action 407, the server system 200 begins preparing another HTTP response message to send back to the client device 210. In preparing the response, the server system 200 generates code for rendering the web page on the client device 210, and the client device 210 can fetch the code for rendering the web page from the server system 200 and then render the page using the web browser application 211 (at action 408).

At action 409, the client device 210 and server system 200 can initiate further subsequent HTTP requests for data in which the processes described with respect to actions 401-408 can be repeated. Although action 401-404 and 405-408 are shown in FIG. 4 as occurring once, these actions 401-404 and 405-408 may, in various embodiments, be repeated a number of times during the loading of a particular page.

Description of FIG. 5

FIG. 5 shows a non-limiting example of an XML file 500 containing transcript data processed by system 260. The XML file 500 can be processed, for example, by the parsing module 207 of the server system 200. In doing so, the parsing module 207 can identify different portions of the XML file 500 based on the XML tags identified in the file 500. For example, the module 207 can identify which portions of the XML file 500 are allocated to the document "header," "body," "footer," and/or any other associated portion. In the example of FIG. 5, the module 207 may parse the document from the top where it will first identify the general information 504 of a particular event. That is, by identifying the tag "Headline" the module 207 will understand that the following element may identify that the document corresponds to a transcript of a company's earnings conference call or presentation on Feb. 25, 2010 held at 4:00 PM GMT.

The parsing module 207 can parse different portions of the transcript of the conversation held at the event identified in the portion of the XML file 500 between the "Body" tags (i.e., between "<Body>" and "</Body>"). The first element 512 following the "Body" tag may correspond to a more detailed description of the event in which the conversation took place. In this example, "COMPANY" held a Q4 and 2009 year-end earnings call in New York. The parsing module 207 can next identify different participants in the call and their corresponding contribution to the discussion based on different delimiters in the XML file 500. For example, portions of the XML file 500 separated by delimiter 510 (shown as "=") can indicate that different participants of the call will be identified.

In the example shown in FIG. 5, the participants are separated into two categories: corporate participants and general participants. The XML file 500 could separate the participants into further categories or could consolidate the participants so that that are in a single category. Each participant could be separated by a different delimiter. For example, each participant could be separated by a "*" delimiter, as shown in FIG. 5.

Between each "*" delimiter, of the corporate participants, is text identifying the name 501 of the corporate participant, the company 502 in which the corporate participant works, and the title 503 of the corporate participant. Of course, further information could be provided, such as the age of the corporate participant, gender of the corporate participant, years in which the corporate participant has been employed with the company, and/or where the corporate participant was educated. This list is of course non-limiting and the corporate participant could have any variety of information associated with her/him.

Following the list of corporate participants (and separated by another delimiter 510) is the list of general participants. Each general participant is separated by another delimiter "*" and between each "*" delimiter of the general participants is text identifying the name 505 of the general participant, the company/firm 506 of which the general participant is associated, and/or the title 507 of the general participant. Of course, further information could be provided, such as the age of the general participant, gender of the general participant, years in which the general participant has been employed with the company, and/or where the general participant was educated. This list is of course non-limiting and the general participant could have any variety of information associated with her/him.

After parsing through the list of participants, the module 207 will begin identifying different portions of the conversation between participants as well as the identity of the person (or people) speaking. In the example shown in FIG. 5, the conversation is separated into two portions: a "Presentation" portion 530 and a "Questions and Answers" portion 540. Of course, the conversation could be separated into more portions or could also be consolidated into a single portion.

Each portion of the conversation begins by identifying the speaker followed by a delimiter 520 indicating that the following portion corresponds to the text spoken by the identified speaker. In the example shown in FIG. 5, the conversation begins by the presentation coordinator (labeled as "Operator") identifying the description of the event and the associated speakers. Following this dialogue is the identification of the first speaker (i.e., "Jane Smith") followed by the speaker's accompanying dialogue. This process can be repeated for the entirety of the dialogue that is spoken during the "Presentation" portion 530.

Within the portion containing spoken dialogue may be another delimiter 511 (shown as "=" in FIG. 5) that separates the different portions of spoken dialogue. Delimiter 511 separates the "Presentation" portion 530 from the "Questions and Answers" portion 540. Similar to the "Presentation" portion 530, the "Questions and Answers" portion 540 begins by identifying the speaker followed by delimiter 521 indicating that the following portion corresponds to the text spoken by the identified speaker. In this example, the conversation entails different questions raised by the general participants and answered by the corporate participants. This process could be repeated for the entirety of the dialogue until the parsing module 207 reaches the end element 508 indicating that the conversation in the XML file 500 has been completed (and fully parsed). The XML file 500 can include further information provided via XML tags including, but not limited to, a city in which the event took place, a company name, a company stock ticker, a start date/time of the event, a company ID, a CUSIP, SEDOL, and ISIN. Of course, such information is non-limiting and any variety of information can be provided in the XML file 500.

After parsing the XML file 500, the module 207 can provide the parsed data to the matching module 208 where the spoken dialogue can be associated with different individuals stored in database 206 of the server system 200 (as described with respect to FIG. 3, above). Such information can then be used by the web server 204 and application server 205 when generating one or more pages in the application that are displayed and accessed by client device 210; such pages may, in some embodiments, be generated, displayed, and accessed as described herein with reference to FIG. 4.

Description of FIG. 6 Through FIG. 11

FIGS. 6-11 show non-limiting example user interfaces for different aspects of the application that are generated by the server system 200 and are displayed and accessed by client device 210. In a specific example embodiment, the system 260 can be implemented for quarterly earnings sessions of different corporations. Generally, an earnings call will comprise a company official discussing the operational results and financial statements for the period that just ended and their outlook for the future. The teleconference will then be opened for questions by investors, financial analysts, and other call participants. The conference will normally have several exchanges where questions will be raised and answered in a matter of seconds thus making it difficult to track which individual asked a question and/or made a comment.

The examples shown in FIGS. 6-11 relate to different pages in a web application for an "Investors Relation" application that show information from example earnings sessions. Of course, the application is non-limiting and the technology envisions any variety of applications that could be used to display content of a transcribed conversation between two or more people.

The following description of FIGS. 6-11 will highlight how data that makes up the web pages may be communicated (e.g., in HTTP request messages), and how various pages in the web application may be generated/displayed; in some embodiments, this communication, generation, and display may be performed as described herein with reference to FIG. 4.

FIG. 6 shows an example page containing various information contained in an "Analyst Profile." The page shown in FIG. 6 may be generated when client device 210 makes an HTTP request message to server system 200. The page displayed in FIG. 6 could show a variety of information related to analyst "Ms. Rose Smith" and/or her associated company. The page could include information related to her contact information, different aspects related to the position she holds at the company, her employment history information 605, as well as the different markets Ms. Smith is involved.

The page can also provide information from different "Q&A" sessions Ms. Smith recently attended. For example, the page could have a "Recent Earnings Q&A" portion 602 identifying one or more events 603 Ms. Smith attended and different dialogue 604 Ms. Smith contributed at the event. As the portion of the page containing this information is relatively limited in space, the portion 602 may contain "snippets" of conversation from only a few events (e.g., two or three events). A user could optionally expand this information by selecting one or more items in portion 602 to generate a page having further details. For example, the use could "click" on any of the text in portion 602 (e.g., any of items 603/604) to expand the information.

FIG. 7 shows a page generated after an example HTTP request message is made by client device 210 to expand the "Earnings Q&A" portion 602 shown in FIG. 6. In FIG. 7, the page contains an overview of different events 703 in which Rose Smith participated, where Ms. Smith made further comments 707 at the events 703. Each event could be separated in a "line item" view based on the date 701 of the particular event 703. Each line item could contain information that includes the date 701 of the event, the company's associated stock ticker 702, information describing the event 703, a comment portion 704 containing one or more comments 707 made by the speaker during the event, a transcript viewing button 705, and a transcript obtaining button 706. For example, the first "line item" shows that Ms. Smith was at a Q3 2014 earnings conference call for company L where she made at least three comments at the event.

Certain elements in each line item may be selectable by a user to generate further information. For example, user selection of the transcript obtaining button 706 could invoke the client device 210 to request download of a full transcript from the server system 200. That is, the client device 210 could send a request to server system 200 requesting a file to be transferred that provides the full transcript from the conversation associated with the "line item" in which the button 706 selection was made. The transcript could be provided in any file format including, but not limited to, a WORD document, text document, PDF document, HTML document, XML document, and/or a rich text format document. The file could be sent in a compressed or uncompressed form and can be sent as a collection of files (e.g., as a ZIP file).

Figure 8:
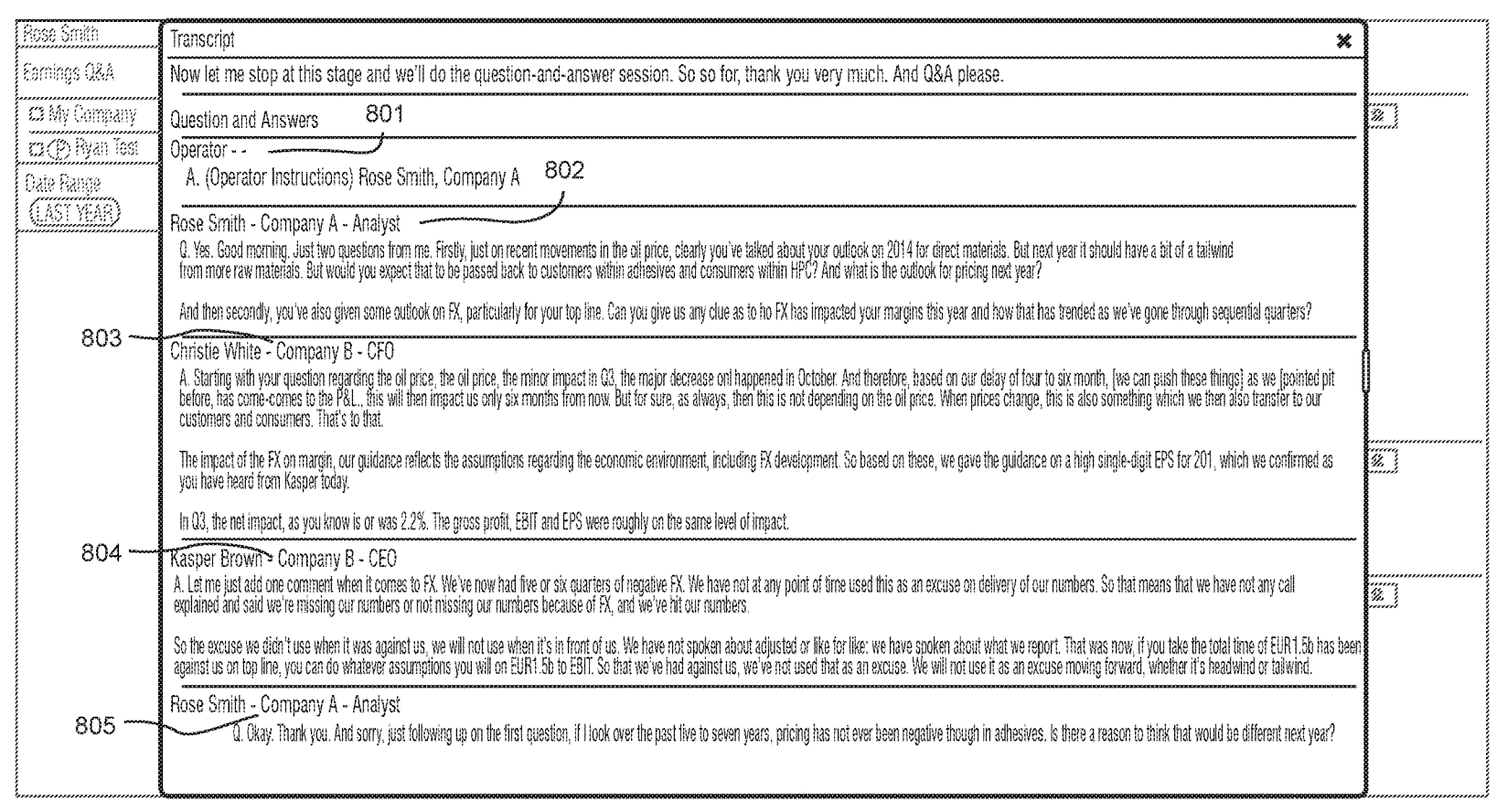

Selection of transcript viewing button 705 enables client device 210 to request a page having content of the full transcript from server system 200. FIG. 8 shows an example HTTP request message sent from client device 210 for generating a page containing a full view of a selected transcript. For example when selecting button 705, client device 210 makes a separate HTTP request obtaining data from server system 200 to generate an overlay page (or a separate page) containing a full transcript of the conversation at the selected event.

The page shown in FIG. 8 shows different portions 802-805 of the transcript of the conversation occurring at the selected event. In this example, Rose Smith poses a first question in portion 802 in which a participant named Christie White provides an answer in portion 803. Participant Kasper Brown adds a comment in response to the question in portion 804 where Rose Smith asks a follow-up question in portion 805.

FIG. 8 thus shows an expanded view when button 705 is selected for the respective conversation where different portions of the transcribed conversation are displayed. It should be appreciated that the example of FIG. 8 could only show a portion of the transcribed conversation where other portions can be viewed by "scrolling" up or down in the page.

Figure 9A:
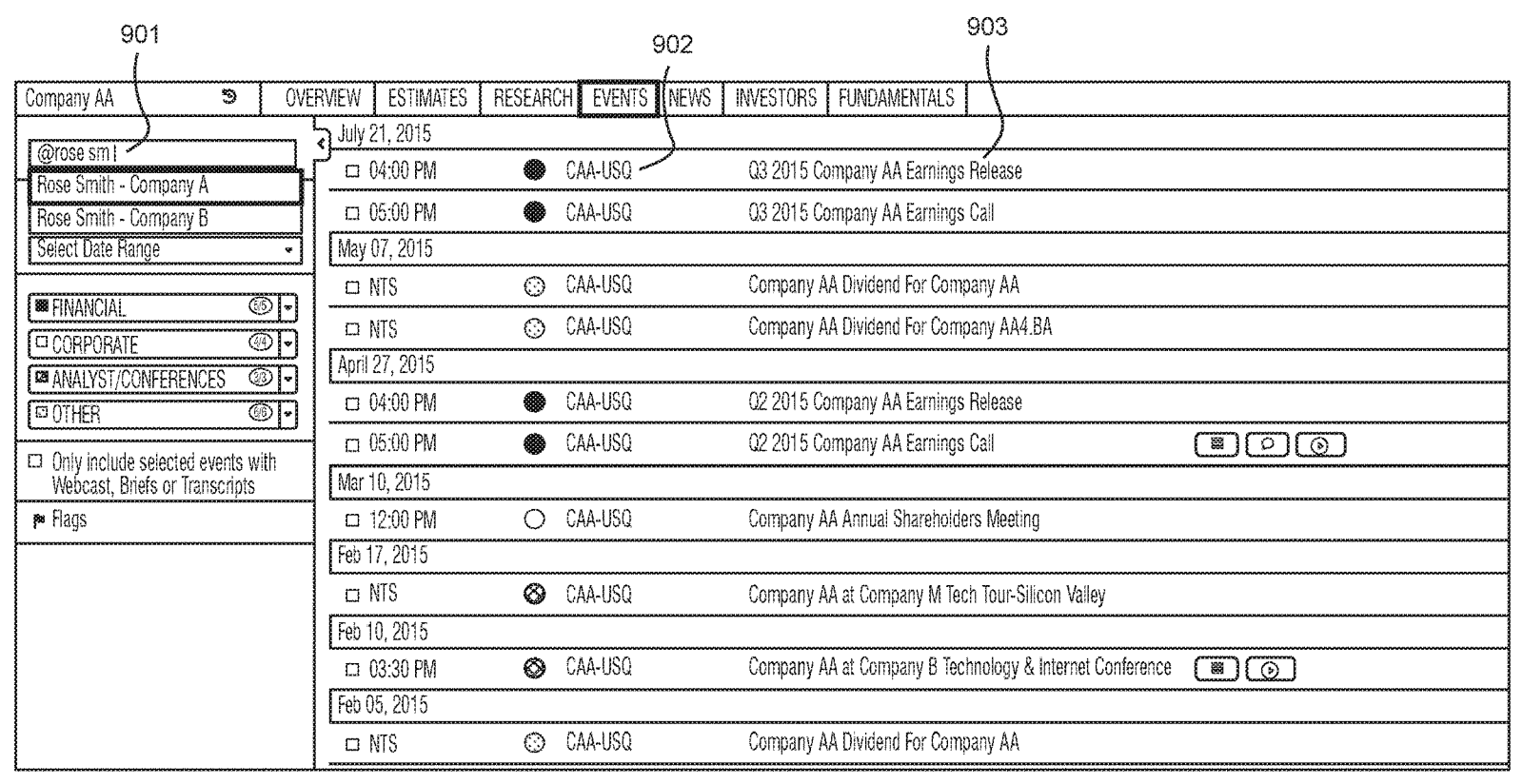
Figure 9B:
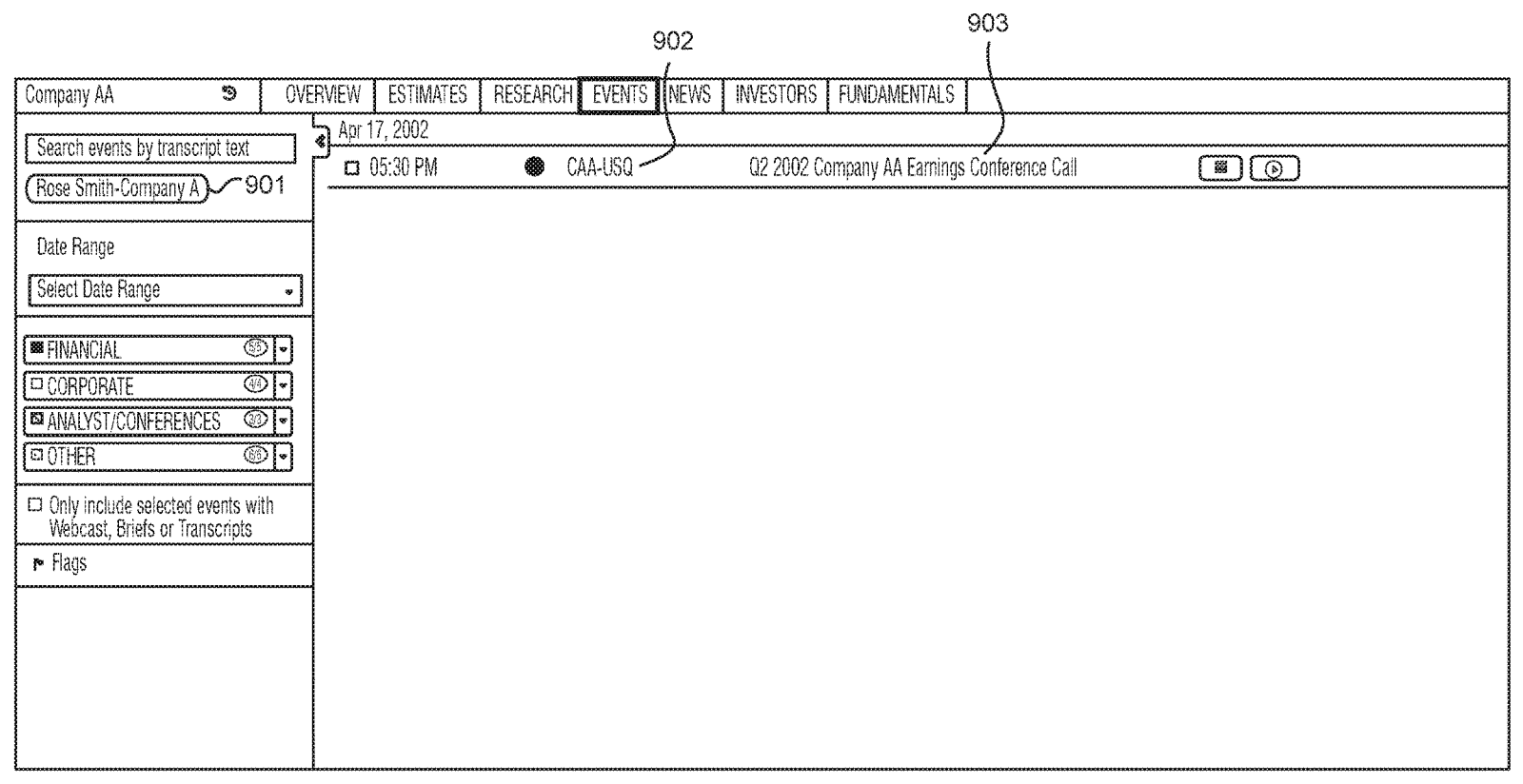

FIGS. 9A and 9B shows pages generated after another example HTTP requests are made by client 210 to server system 200 for generating a page providing a selection of available events in which certain events contain transcript data. FIG. 9A shows an example page of different events 903 associated with a particular company (that can be identified by a company stock ticker 902). Each respective event 903 can be selected by a user to generate a page having data showing further information from the event.

A user can also enter text into input portion 901 to search for an individual and the events in which they may have been associated. For example, the user could enter the name Rose Smith to find one or more individuals for selection. Upon selecting an individual, the specific events in which the individual was associated may be displayed.

FIG. 9B shows an example where Rose Smith of company A was selected. The client device 210 could make an additional HTTP request to server 200 to request information showing the events 903 where Rose Smith participated and/or spoke. In this example, the display shows a filtered selection of a single event for a Q2 2002 company earnings conference call where Rose Smith participated. Of course, the method of filtering is non-limiting and the system can filter in any variety of ways. For example, the system could filter based on organization or different event dates.

Similar to the "line items" shown in FIG. 7, each event can have buttons allowing selective downloading of different data related to the event. For example, selection of a button could enable client device 210 to initiate downloading of a file containing information related to the event, or to initiate generation of a new (or additional) page containing further information from the event.

FIG. 10 shows a page resulting from another example HTTP request made by client 210 to server 200 for generating a profile page of an organization. Similar to FIG. 6, the example page shown in FIG. 10 contains profile information of a selected organization. Each organization is identified by an organization name 1001 where the page can display different information related to the organization. For example, various history of the organization can be displayed along with different contact information 1001 containing information of key contacts within the organization and their respective contact details.

The page displayed in FIG. 10 can also show information from different "Q&A" sessions 1002 associated with the organization. For example, the page could have a "Recent Earnings Q&A" portion 1002 identifying one or more events 1003 related to the organization and different dialogues 1004 contributed by different participants at the event. As the portion of the page containing this information is relatively limited in space, the portion 1002 may contain "snippets" of conversation from only a few events (e.g., two or three events). A user could optionally expand this information by selecting one or more items in portion 1002 to generate a page having further details.

Figure 11:
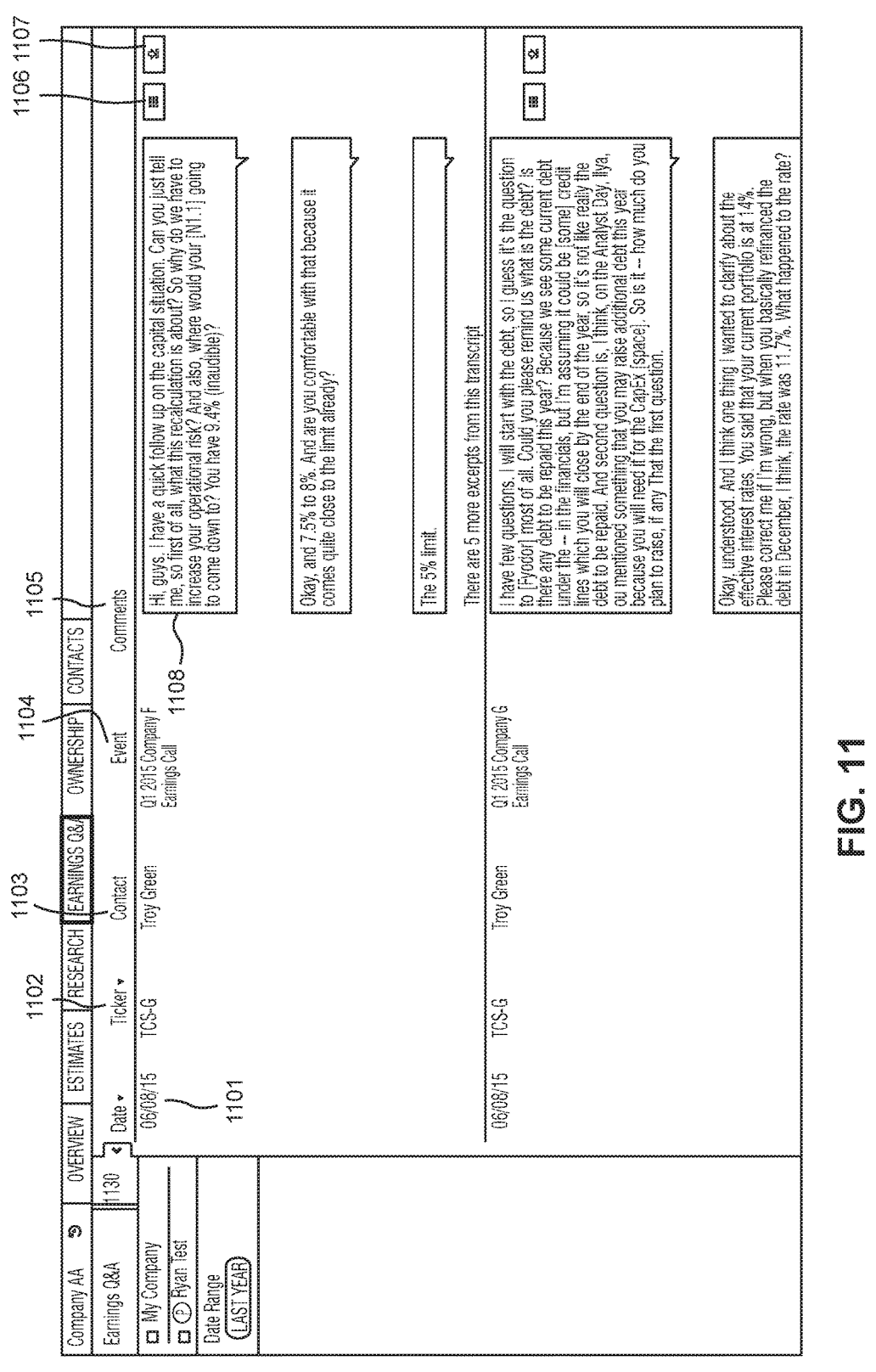

FIG. 11 shows a page resulting from another example HTTP request made by client device 210 to expand the "Earnings Q&A" portion 1002 shown in FIG. 10. Similar to FIG. 7, the page displayed in FIG. 11 contains an overview of different events 1104 held in association with Company AA. Each event could be separated in a "line item" view based on the date 1101 of the particular event. Each line item could contain information that includes the date 1101 of the event, the company's associated stock ticker 1102, information describing the event 1104, a name of one or more contacts 1103 associated with the respective company (e.g., that attended/participated in the event), a comment portion 1105 containing one or more comments 1108 made by a speaker during the event, a transcript viewing button 1106, and a transcript obtaining button 1107. For example, the first "line item" shows that Troy Green was at a Q1 2015 earnings conference call for company F where several comments were made during this event.

As the page shown in FIG. 11 is limited in displayable space, only certain comments from the event may be shown for a particular "line item." In this case, the area containing the respective "line item" could have text indicating that more excerpts are available from a particular transcript and could be user selectable in order to expand the area of the "line item" or generate an additional page showing the transcripts. The area could also be scrollable so that a user can scroll up, down, left, or right to view further excerpts.

Certain elements in each line item may be selectable by a user to generating further information. For example, user selection of the transcript obtaining button 1107 invokes the client device 210 to request download of a full transcript from the server 200. That is, the client device 210 could send a request to server 200 requesting a file to be transferred that provides the full transcript from the conversation associated with the "line item" in which the button 1107 selection was made. The transcript could be provided in any file format including, but not limited to, a WORD document, text document, PDF document, HTML document, XML document, and/or a rich text format. The file could be sent in a compressed or uncompressed form and can be sent as a collection of files (e.g., as a ZIP file).

Selection of transcript viewing button 1106 enables client device 210 to request a page having content of the full transcript from server 200. FIG. 8 shows a page generated from an example HTTP request message sent from client device 210 for generating a page containing a full view of a selected transcript. For example when selecting button 1106, client device 210 can make a separate HTTP request obtaining data from server 200 to generate an overlay page (or a separate page) containing a full transcript of the conversation at the selected event, as can be seen in the example shown in FIG. 8.

Description of FIG. 12

FIG. 12 shows a non-limiting example block diagram of a hardware architecture for the system 1260. In the example shown in FIG. 12, the client device 1210 communicates with a server system 1200 via a network 1240. The network 1240 could comprise a network of interconnected computing devices, such as the internet. The network 1240 could also comprise a local area network (LAN) or could comprise a peer-to-peer connection between the client device 1210 and the server system 1200. As will be described below, the hardware elements shown in FIG. 12 could be used to implement the various software components and actions shown and described above (relative to FIGS. 3 and 4, and in other places) as being included in and/or executed at the client device 1210 and server system 1200.

In some embodiments, the client device 1210 (which may also be referred to as "client system" herein) includes one or more of the following: one or more processors 1212; one or more memory devices 1214; one or more network interface devices 1216; one or more display interfaces 1218; and one or more user input adapters 1220. Additionally, in some embodiments, the client device 1210 is connected to or includes a display device 1222. As will explained below, these elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some embodiments, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1212 uses an instruction set architecture such as x86 or Advanced RISC Machine (ARM).

In some embodiments, each or any of the memory devices 1214 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some embodiments, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1218 is or includes one or more circuits that receive data from the processors 1212, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some embodiments, each or any of the display interfaces 1218 is or includes, for example, a video card, video adapter, or graphics processing unit (GPU).

In some embodiments, each or any of the user input adapters 1220 is or includes one or more circuits that receive and process user input data from one or more user input devices (not shown in FIG. 12) that are included in, attached to, or otherwise in communication with the client device 1210, and that output data based on the received input data to the processors 1212. Alternatively or additionally, in some embodiments each or any of the user input adapters 1220 is or includes, for example, a PS/2 interface, a USB interface, a touchscreen controller, or the like; and/or the user input adapters 1220 facilitates input from user input devices (not shown in FIG. 12) such as, for example, a keyboard, mouse, trackpad, touchscreen, etc. . . .

In some embodiments, the display device 1222 may be a Liquid Crystal Display (LCD) display, Light Emitting Diode (LED) display, or other type of display device. In embodiments where the display device 1222 is a component of the client device 1210 (e.g., the computing device and the display device are included in a unified housing), the display device 1222 may be a touchscreen display or non-touchscreen display. In embodiments where the display device 1222 is connected to the client device 1210 (e.g., is external to the client device 1210 and communicates with the client device 1210 via a wire and/or via wireless communication technology), the display device 1222 is, for example, an external monitor, projector, television, display screen, etc. . . .

In various embodiments, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some embodiments, the client device 1210 includes one or more of: a processing system that includes the processors 1212; a memory or storage system that includes the memory devices 1214; and a network interface system that includes the network interface devices 1216.

The client device 1210 may be arranged, in various embodiments, in many different ways. As just one example, the client device 1210 may be arranged such that the processors 1212 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system 200 of FIG. 2. In some embodiments, the server system 1200 (which may also be referred to as "server device" herein) includes one or more of the following: one or more processors 1202; one or more memory devices 1204; and one or more network interface devices 1206. As will explained below, these elements (e.g., the processors 1202, memory devices 1204, network interface devices 1206) are hardware devices (for example, electronic circuits or combinations of circuits) that are configured to perform various different functions for the server system 1200.

In some embodiments, each or any of the processors 1202 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1202 uses an instruction set architecture such as x86 or Advanced RISC Machine (ARM).

In some embodiments, each or any of the memory devices 1204 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some embodiments, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In various embodiments, the server system 1200 includes one, or two, or three, four, or more of each or any of the above-mentioned elements (e.g., the processors 1202, memory devices 1204, network interface devices 1206). Alternatively or additionally, in some embodiments, the server system 1200 includes one or more of: a processing system that includes the processors 1202; a memory or storage system that includes the memory devices 1204; and a network interface system that includes the network interface devices 1206.

The server system 1200 may be arranged, in various embodiments, in many different ways. As just one example, the server system 1200 may be arranged such that the processors 1202 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 210 or the server system 200, each of which will be referred to individually for clarity as a "component" for the remainder of this paragraph, are implemented using an example of the client device 1210 or the server system 1200 of FIG. 12. In such embodiments, the following applies for each component: (a) the elements of the client device 1210 shown in FIG. 12 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the respective memory devices (e.g., in various embodiments, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some embodiments, such data is stored in the respective memory devices (e.g., in some embodiments, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some embodiments, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

The hardware configurations shown in FIG. 12 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 12, (e) via other hardware arrangements, architectures, and configurations, and/or via combinations of the technology described in (a) through (e).

Technical Advantages of Described Subject Matter

The technology described herein allows for more efficient storage and processing of the transcript data and improves the system's ability to display information and interact with a user. In particular, the system can process large volumes of transcript data by selectively parsing and associating different portions of the transcript data to respective speakers. The system then efficiently stores the same in a database managed by the system so that the data can be used in generating the user interface. In doing so, the system efficiently stores, organizes, and manages large volumes of data by breaking the data down into understandable components that are used in fast and efficient generation of a display presenting the data.

The resultant user interface generated by the system thus provides information in an easy-to-view manner. In particular, the user interface provides snapshots on comments individuals made when viewing a particular profile (e.g., an individual profile, an organization profile) at a high level. The graphical user interface thus presents the transcript information in a manner that is significantly easier to understand and access than viewing the transcript data itself. Thus, the technology also provides improvements in the technical area of software user interfaces and generates an interface that improves the system's ability to interact with the user.

Selected Definitions

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Further Applications of Described Subject Matter

Although a number of references are made in this document to web applications, it should be understood that the features described herein may also be used, in various embodiments, in the context of other types of applications such as applications that are deployed/installed as binaries on client systems.

Although process steps, algorithms or the like, including without limitation with reference to FIGS. 1-12, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system configured to associate an analyzed transcript to a speaker, comprising:
   a network interface device;
   a processor; and
   a memory, operatively coupled to the network interface device and the processor and storing computer readable instructions that, when executed by the processor, cause the system to:
      obtain transcript data of a dialogue between two or more people;
      parse the obtained transcript data;
      identify one or more portions of the parsed transcript data based on identification information contained in one or more tags in the transcript data;
      identify one or more elements in a portion, of the one or more portions, of the transcript data based on one or more delimiter types contained in the portion of the transcript data;
      determine at least one speaker from the parsed transcript data by identifying at least a name of the speaker from the one or more identified elements;
      associate at least a portion of spoken dialogue from the parsed transcript data to the determined speaker by linking the portion of spoken dialogue to the name of the speaker;
      store the portion of the spoken dialogue and the name of the speaker in association with each other in a database; and
      generate data for displaying a user interface that displays web-pages having at least a first page, a second page, and a third page, wherein:
         the first page includes a layout containing a plurality of elements associated with a profile, wherein the plurality of elements includes at least market information, contact information, and at least a portion of the spoken dialogue associated with the speaker, the plurality of elements divided on the first page so that the portion of the spoken dialogue is positioned proximate to the contact information and the market information, and selection of the portion of the spoken dialogue causes display of the second page;
         the second page includes:
            additional dialogue associated with each of a plurality of events in which the speaker has spoken; and
            a transcript button proximate to the additional dialogue associated with an event from the plurality of events in which the speaker has spoken; and
            selection of the transcript button causes display of the third page, wherein the third page includes a full text version of a transcript of the event, wherein the full text version of the transcript of the event includes the portion of the spoken dialogue of the speaker and dialogue of additional speakers for the event.

2. The system of claim 1, wherein the transcript data contains first text data corresponding to a dialogue of a first speaker and an identification of the first speaker sequentially following the first text data, the first text data and the identification of the first speaker separated by at least one delimiter.

3. The system of claim 2, wherein the identification of the first speaker includes at least a name of the first speaker, an entity in which the first speaker is associated, and a title held by the first speaker.

4. The system of claim 1, wherein
   the transcript data is incorporated into a structured document comprising metadata, a body of the structured document, and one or more additional identifiers, and
   the metadata includes at least an event identifier, an event type name, an event story identifier, and/or an expiration data.

5. The system of claim 1, wherein
   the transcript data is incorporated into a structured document comprising metadata, a body of the structured document, and one or more additional identifiers, and
   the body of the structured document includes at least text of an event, one or more questions raised during the event, and one or more answers provided to the questions raised during the event.

6. The system of claim 1, wherein
   the transcript data is incorporated into a structured document comprising metadata, a body of the structured document, and one or more additional identifiers, and
   the one or more additional identifiers include at least a city, a company name, and/or a company identifier.

7. The system of claim 1, wherein a body of the transcript data includes portions containing organizers of an event, participants of the event, presentation content of the event, and question and answer content of the event, and wherein parsing the transcript data comprises identifying the portions containing the organizers of the event, the participants of the event, the presentation content of the event, and the question and answer content of the event based on a first type of delimiter.

8. The system of claim 1, wherein the portion of the spoken dialogue is positioned below the contact information on the first page.

9. The system of claim 1, wherein the portion of the spoken dialogue is positioned above the market information on the first page.

10. The system of claim 1, wherein a body of the transcript data includes a first portion including a listing of speakers presenting at an event, and wherein parsing the obtained transcript data comprises identifying a name of a presenter and a name of a company associated with the presenter, in the first portion, based on a first type of delimiter in the transcript data.

11. The system of claim 10, wherein parsing the obtained transcript data comprises identifying a title of the presenter, in the first portion, based on a second type of delimiter in the transcript data.

12. A non-transitory computer-readable storage medium comprising computer readable code for associating an analyzed transcript to a speaker which, when executed by a computer having one or more processors, causes the computer to:
   obtain transcript data of a dialogue between two or more people;
   parse the obtained transcript data based on one or more delimiters contained within the transcript data and identify one or more elements in a portion of the transcript data;

determine at least one speaker from the parsed transcript data by identifying at least a name of the speaker from the one or more identified elements;

associate at least a portion of spoken dialogue from the parsed transcript data to the determined speaker;

store the portion of the spoken dialogue in association with the name of the speaker in a database; and generate data for displaying a user interface that displays web-pages having at least a first page, a second page, and a third page, wherein:

the first page includes a layout containing a plurality of elements associated with a profile, wherein the plurality of elements includes at least market information, contact information, and at least a portion of the spoken dialogue associated with the speaker, the plurality of elements divided on the first page so that the portion of the spoken dialogue is positioned proximate to the contact information and the market information, and selection of the portion of the spoken dialogue causes display of the second page;

the second page includes:

additional dialogue associated with each of a plurality of events in which the speaker has spoken; and a transcript button proximate to the additional dialogue associated with an event from the plurality of events in which the speaker has spoken; and selection of the transcript button causes display of the third page, wherein the third page includes a full text version of a transcript of the event, wherein the full text version of the transcript of the event includes the portion of the spoken dialogue of the speaker and dialogue of additional speakers for the event.

13. The non-transitory computer-readable storage medium of claim 12, wherein the transcript data contains first text data corresponding to a dialogue of a first speaker and an identification of the first speaker sequentially following the first text data, the first text data and the identification of the first speaker separated by at least one delimiter.

14. The non-transitory computer-readable storage medium of claim 13, wherein the identification of the first speaker includes at least a name of the first speaker, an entity in which the first speaker is associated, and a title held by the first speaker.

15. A method for associating an analyzed transcript to a speaker, comprising:

at an information processing apparatus having at least a memory, a transceiver, and a processor:

obtaining transcript data of a dialogue between two or more people;

parsing the obtained transcript data based on one or more delimiters contained within the transcript data and identifying one or more elements in a portion of the transcript data;

determining at least one speaker from the parsed transcript data by identifying at least a name of the speaker from the one or more identified elements;

associating at least a portion of spoken dialogue from the transcript data to the determined speaker;

storing the portion of the spoken dialogue in association with the name of the speaker in a database; and generating data for displaying a user interface that displays web-pages having at least a first page, a second page, and a third page, wherein:

the first page includes a layout containing a plurality of elements associated with a profile, wherein the plurality of elements includes at least market information, contact information, and at least a portion of the spoken dialogue associated with the speaker, the plurality of elements divided on the first page so that the portion of the spoken dialogue is positioned proximate to the contact information and the market information, and selection of the portion of the spoken dialogue causes display of the second page;

the second page includes:

additional dialogue associated with each of a plurality of events in which the speaker has spoken; and a transcript button proximate to the additional dialogue associated with an event from the plurality of events in which the speaker has spoken; and selection of the transcript button causes display of the third page, wherein the third page includes a full text version of a transcript of the event, wherein the full text version of the transcript of the event includes the portion of the spoken dialogue of the speaker and dialogue of additional speakers for the event.

16. The method of claim 15, wherein the transcript data contains first text data corresponding to a dialogue of a first speaker and an identification of the first speaker sequentially following the first text data, the first text data and the identification of the first speaker separated by at least one delimiter.

17. A client device configured to generate a user interface containing information related to an analyzed transcript, comprising:

a memory storing computer readable instructions for execution;

a display device;

a network interface device; and a processor operatively coupled to the memory, the network interface device, and the display device, the processer controlling the client device to:

request first data, stored in a database of a server, for generating a user interface providing information related to a spoken dialogue associated with a speaker;

receive the first data from the server;

construct portions of the user interface, for display by the display device, that include web-pages having at least a first page, a second page, and a third page, wherein:

the first page includes a layout containing a plurality of elements associated with a profile, wherein the plurality of elements includes at least market information, contact information, and at least a portion of the spoken dialogue associated with the speaker, the plurality of elements divided on the first page so that the portion of the spoken dialogue is positioned proximate to the contact information and the market information, and selection of the portion of the spoken dialogue causes display of the second page;

the second page includes:

additional dialogue associated with each of a plurality of events in which the speaker has spoken; and a transcript button proximate to the additional dialogue associated with an event from the plurality of events in which the speaker has spoken; and selection of the transcript button causes display of the third page, wherein the third page includes a full text version of a transcript of the event, wherein the full text version of the transcript of the event includes the portion of the spoken dialogue of the speaker and dialogue of additional speakers for the event.

18. The client device of claim 17, wherein the full text version of the transcript of the event containing identification of one or more speakers and their associated contribution of spoken dialogue at the event.

\* \* \* \* \*